March 8, 1949.    E. E. WEMP    2,463,582
TORUS CHAMBER HYDRAULIC TORQUE CONVERTER
Original Filed Oct. 5, 1942    2 Sheets-Sheet 1
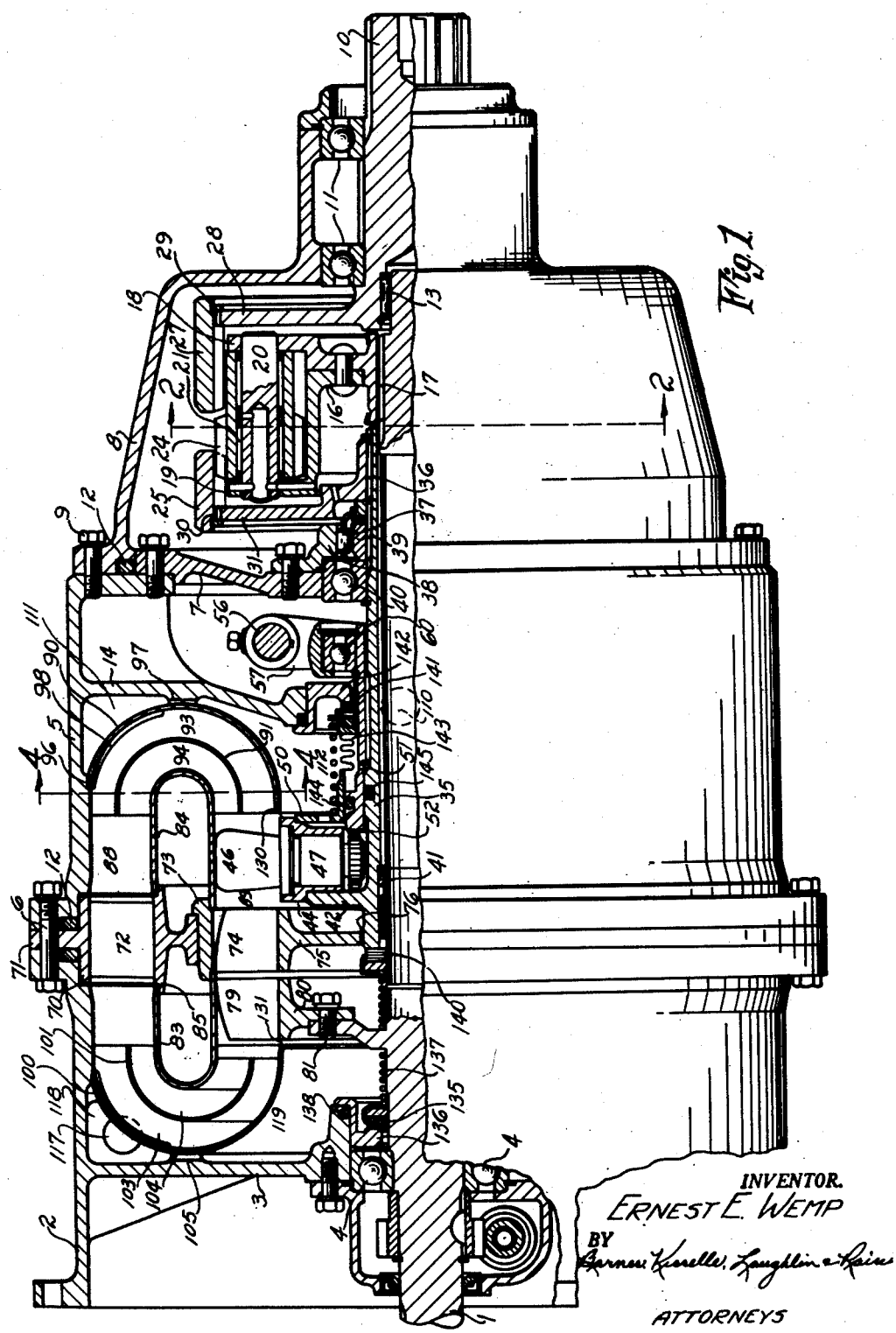
INVENTOR.
ERNEST E. WEMP
BY
ATTORNEYS March 8, 1949. E. E. WEMP 2,463,582
TORUS CHAMBER HYDRAULIC TORQUE CONVERTER
Original Filed Oct. 5, 1942 2 Sheets-Sheet 2

INVENTOR.
ERNEST E. WEMP
BY
ATTORNEYS.

Patented Mar. 8, 1949

2,463,582

UNITED STATES PATENT OFFICE 2,463,582

TORUS CHAMBER HYDRAULIC TORQUE CONVERTER

Ernest E. Wemp, Detroit, Mich., assignor of five per cent to Eleanor May Wemp, Los Angeles, Calif., twenty per cent to Lila A. Wemp, five per cent to Leah Kathleen Smith, and five per cent to Clyde J. Smith, all of Detroit, Mich.

Original application October 5, 1942, Serial No. 460,795, now Patent No. 2,368,279, January 30, 1945. Divided and this application December 11, 1944, Serial No. 567,728

8 Claims. (Cl. 60—54)

REISSUED

JUN 13 1950

This invention relates to a torus chamber structure of a hydraulic mechanism. The torus chamber is one useful in a torque converter of the fluid or hydraulic type for providing infinitely variable torque and speed ratios between driving and driven members or in other hydraulic torque transmitting mechanisms. This application is a division of application Serial No. 460,795, filed October 5, 1942 and now Patent No. 2,368,279 dated January 30, 1945.

The torus chamber is one where a liquid, such as a suitable oil, water, or the like is caused to flow therethrough and vaned or bladed members are positioned in the torus chamber to act upon the liquid and to be acted upon by the liquid. In the disclosure herein there is a torque converter with a member which is termed the turbine having blades in the torus chamber, another member which is termed an impeller with blades in the torus chamber and a stator member with fixed blades. The torus chamber is axially disposed and extends circumferentially about the axis of rotation of the rotating members, and the torus chamber has inner and outer circumferential passages with return bends at the ends which extend through 180°, thereby connecting the inner and outer passages. The blades of the several members are disposed in the inner passage of the torus chamber. One particular object of the invention is the provision of an arrangement in a liquid torus chamber for providing a substantially uniform velocity front, particularly at the point in the circuit where the liquid is to encounter the blades of one of the rotary bladed elements. In the construction shown herein, this bladed element is the impeller. In order to fully disclose the operation and function of the torus chamber the features of the torque converter are shown in the accompanying drawings and are described in the following detailed specification. Other objects of the invention will be appreciated as the drawings and detailed specification are followed.

In the drawings:

Fig. 1 is a view of the torque converter, being partly in section and partly in side elevation and showing the construction of the hydraulic unit and the mechanical parts.

Figure 3:
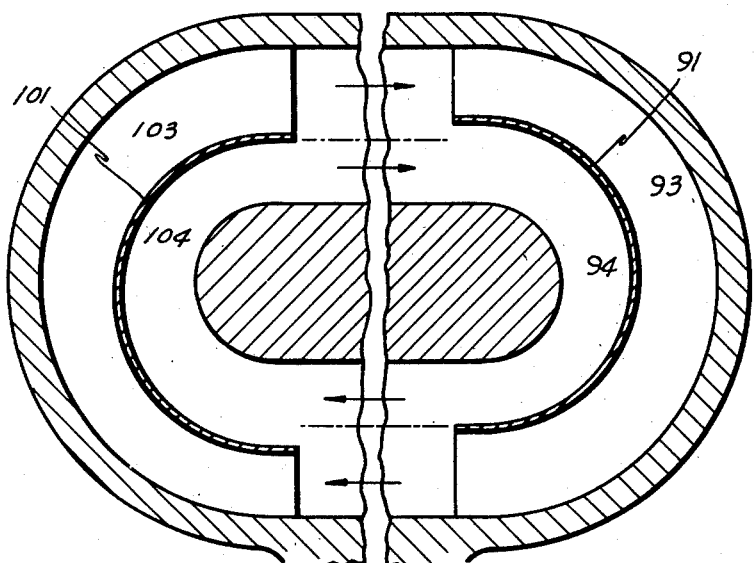
Fig. 3 is a cross sectional diagrammatic view showing the two ends of the torus chamber moved in proximity to each other with the vaned elements removed to demonstrate the arrangement for providing a substantially uniform velocity front for the liquid.

In Fig. 1 a drive shaft is illustrated at 1 and this is to be connected to a prime mover. The apparatus of this invention appears to be particularly useful with an engine of the internal combustion variety commonly used on both passenger and commercial automotive vehicles, although used in many other place. A housing is shown as including a housing section 2 which may be designed to be connected directly to the prime mover. This housing has an enclosing head or plate 3 in which the shaft 1 is journalled as at 4. The housing includes a second section 5 connected to the housing part 2 as at 6. This part of the housing has a removable end plate or wall 7 and an intermediate head 14. An end portion 8 of the housing is attached to the section 5 as at 9 and a driven member or shaft 10 is journalled in the end section of the housing as at 11. Suitable sealing devices or gaskets are used where the housing sections are joined and these are generally illustrated at 12. The driving shaft 1 is journalled or piloted within the driven member 10 as shown at 13.

Figure 2:
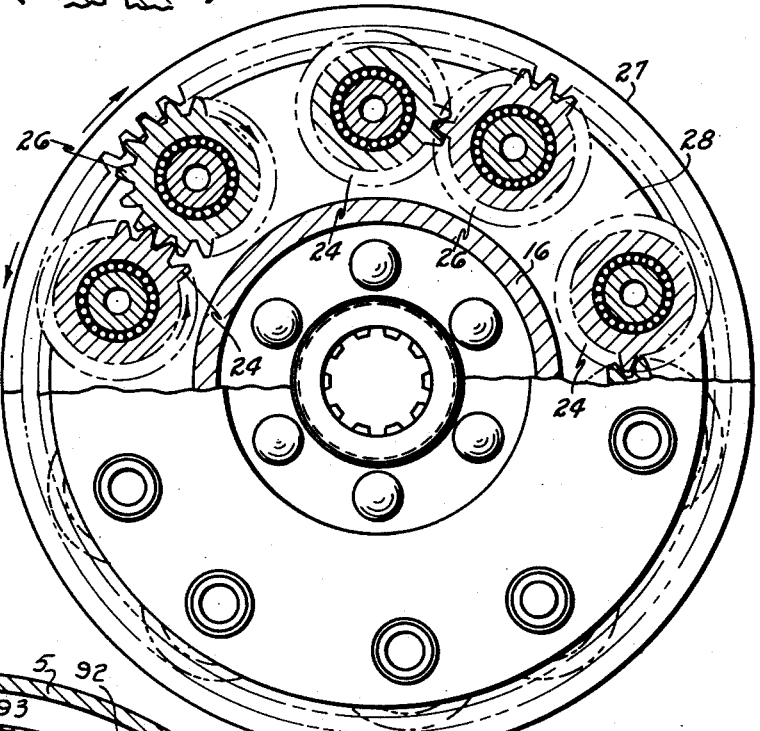
Fig. 2 is a sectional view taken substantially on line 2—2 of Fig. 1 showing the epicyclic gear arrangement.

First taking up the epicyclic gearing which is situated in the housing section 8, it will be noted that a carrier 16 for the planetary gears is splined to the driving shaft as at 17. This carrier has spaced side plates 18 and 19 for receiving pins 20 upon which the planetary gears are journalled advantageously by small roller bearings 21. As will be seen by reference to Fig. 2, the planetary gears are arranged in pairs. One gear 24 of each pair has gear teeth adjacent one end for meshing with an internally geared element 25. The other gear 26 of each pair has gear teeth adjacent the opposite end for meshing with the internal geared element 27. The teeth of each pair of gears mesh with each other, as shown in Fig. 2. The element 27 is a driven element in that it is connected to a flange 28 of the driven shaft 10, as at 29. The geared element 25 constitutes one of the control members associated with the hydraulic unit and is drivingly connected as at 30 to a plate 31. With this arrangement there is a —1:1 ratio between the internally geared elements 25 and 27. That is, if the planet carrier 16 be held locked, rotation of gear 25 in one direction will produce an equal rotation of gear 27 in the opposite direction.

The torque delivered by the driving shaft 1 is divided with some being transmitted into the driven member 10 and some into the controlling means and to the hydraulic unit through the elements 25 and 31.

Rotatably mounted upon the driving shaft 1 is a sleeve 35 and the plate 31 is keyed or splined thereto as at 36. For purposes which will presently appear, this sleeve and the parts connected thereto are prevented from backward or negative rotation by means of a one-way acting roller brake 37 wherein the rollers are arranged to grip a stationary outer ring 38 secured to the housing member 7 and an inner ring 39 secured to the sleeve 35. The sleeve is journalled in the housing as at 40 and is piloted on the driving shaft as at 41.

This sleeve carries the blades of the impeller. It has a flange 42 for receiving and holding a hub element for receiving the impeller blades. Each blade proper is illustrated at 46 and each has a pintle 47 journalled in the hub.

For controlling the angularity of the impeller blades there is a control sleeve 51 which is axially shiftable on the sleeve 35. The sleeve has portions (not shown) with gear teeth meshed with gear teeth formations on the pintles so that axial shift of the sleeve rotates the blades on their axes.

The control of the axial position of the control sleeve 51 may be accomplished through the means of a rock shaft 56 journalled in the housing and having a yoke 57 operating on the sleeve through a thrust bearing 60. Suitable control means is to be provided for the rock shaft.

A stator is positioned so that its blades or vanes are positioned in the torus chamber adjacent the impeller. The stator may comprise an outer supporting member 70 having a flange 71 positioned between the housing members 2 and 5. A number of struts 72 connect the inner and outer portions of the supporting member and are positioned to lie in the torus chamber. These struts are preferably of streamline construction to minimize interference with the flow of liquid in the torus chamber. The inner or bladed section of the stator has a body 73 press fitted or otherwise non-rotatably secured in the supporting member 70 and it has blades 74 lying between the inner and outer ring parts thereof and it also has an inwardly extending flange 75 which has a close but rotatable fit with the end portion of the sleeve 35, this location being indicated at 76.

The turbine is a member having blades 79 carried by a body member 80 which is secured to a flange on the driving member 1 as shown at 81. It will be noted that the blades of the impeller, stator and turbine are situated in the torus chamber and that the blades are disposed so that they are positioned substantially on the same radius and in the torus chamber where the liquid is flowing axially or substantially axially.

The torus chamber is located in the space more or less defined by the housing members 2 and 5 and it will be understood that the torus chamber is concentric with the drive shaft 1 and it will be seen that the chamber is somewhat elongated in cross section with its long axis disposed axially of the drive shaft. The inner core of the torus chamber is advantageously provided with two sheet metal members formed into U-shape cross section, as shown at 83 and 84, with their edges fitting into machined offsets in the supporting member 70 and in the bladed member 73, as illustrated at 85. The inner and outer ring parts of the support 70 complete the outer portion of the torus chamber between the casing members 2 and 5.

An important point in the torus chamber construction lies in the nest formation at the ends of the long axis of the torus chamber where the liquid is to be directed through an angle of 180°, as this structure has to do with obtaining a substantially uniform velocity front, particularly where the liquid engages the impeller blades. For convenience the torus chamber may be considered as having an axial passage 88 in which lie the supporting struts 72 and an axial passage 89 which accommodates the blades of the impeller, stator and turbine, with the end portions at opposite ends of these passages.

Figure 4:
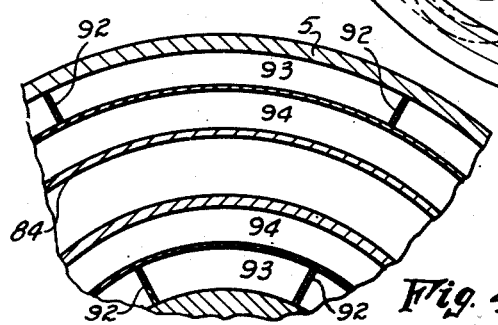
Fig. 4 is a cross sectional view taken substantially on line 4—4 of Fig. 1 showing the arrangement in the torus chamber.

One end portion comprises an outer wall 90 in the form of a sheet metal annulus of curved form in cross section and a nest structure is provided by an additional dividing wall 91. The walls 90 and 91 may be connected into a single sub-assembly by plates or strips 92 (Fig. 4) and this structure provides an outer channel or passage 93 and an inner channel or passage 94 through which the liquid flows. For the purpose of holding this nest structure in position within the housing, the housing may be formed to provide a seat and shoulder 96 for the outer peripheral edge of the member 90 while the bottom of the member 90 seats upon the partition 14 having accurately machined lugs or projections 97. The lugs or projections 97 permit passage of fluid past the same. The strips 92 are cut away as at 98 to provide some spacing relative to the member 90 with the result that the member 90 may be pushed into position within the housing part 5 and its outer peripheral edge is flexed and then the same snaps into position behind the shoulder at 96.

The opposite end of the torus chamber is of similar construction and which can be similarly assembled, the outer wall being shown at 100, the nest wall at 101 forming passageways 104 and 103 and the end head 3 of the housing 2 is formed with the projections 105 upon which the member 100 seats. The direction of flow of liquid in the torus chamber is clockwise as Fig. 3 is viewed and as shown by the arrows, and the arrangement of the nesting structure, as mentioned above, provides for the obtaining of the substantially uniform velocity front, particularly at the impeller blades, but this point will be discussed later.

The liquid to be used in the torus chamber may be an oil or special substance provided for the purpose or water, and water is advantageous because of its relatively high specific gravity and low viscosity. The liquid may be pumped into the casing through the inlet 110 and removed through outlet 117 by a suitable pump (not shown) located outside the casing. The liquid may be thus maintained in the casing under suitable pressure and circulated therethrough although the liquid in the torus chamber is circulating through the torus chamber.

A clearance 130 is provided between the inner peripheral edge of the nest plate 90 and the impeller and the water pumped into the space 111—112 may enter the torus chamber through this clearance and the water is already moving generally in the direction of the flow in the torus chamber. A clearance 131 is provided between the turbine and the inner peripheral edge of the nest plate 100 so that the water which is displaced by that coming into the torus chamber flows out through the clearance 131 into the chamber 119—118. The inner peripheral edge of the nest plate 100 may be flared outwardly of the torus chamber, as shown.

It will be seen that the entire space in the housing between the end head 3 and the head 14 contains the liquid under pressure and suitable seals should be provided. To this end a seal structure 135 frictionally engages a shouldered element 136 under the pressure of a spring 137 to provide a seal between the housing and the shaft adjacent the bearing 4. The element 136 may be sealed relative to the housing by a so-called O-ring 138. A similar seal is provided at one end of the sleeve 35 as at 140. Another seal 141 engages element 142 sealed to the head 14 by an O-ring and this seal may be of the expanding bellows type having a bellows 143, one end of which joins the sealing member 141 and the other of which connects to a flange on the washer 50. This prevents the escape of liquid around the outside of the reciprocating control sleeve 51. Seals of the O-ring type may also be employed between the control sleeve 51 and the member 50 as shown at 144 and between the control sleeve and the impeller sleeve, as shown at 145, there being no relative rotation between these parts but only a movement comprising the axial shift of the control sleeve 51.

Before describing the operation of the structure, reference should be made to Fig. 3 showing the torus chamber nesting arrangement. It has been found that with a torus chamber of this general type the velocity of the liquid in the outer regions of the torus chamber is greater than that near the inner regions. The outer regions of the torus chamber thus referred to are those adjacent the nest plates 90 and 100 and the walls of the axial parts of the chamber in line with the ends of these nest plates, while the inner regions are those adjacent the core. The preferred arrangement is to construct the blades, and particularly the blades of the impeller, to operate at a uniform velocity across their radial extent, the shape of the blade being varied to take care of the varying radius but being designed to provide a straight line function across its face on any given radius. To provide for a uniform velocity front, particularly where the liquid enters the impeller blades, the nest plates 91 and 101 are offset relative to each other. In an advantageous structure, the nest plate 91 may be positioned so that the area in the inlet of the passage 93 is substantially equal to the inlet of the passage 94. In other words, the area of the passages 93 and 94, where they communicate with the axial passage 88, are equal. Likewise, the areas at the outlet of passage 94 and outlet of passage 93 are equal. Thus, it will be seen the radial dimension across the outlet of passage 93, which is on the smaller radius, is greater than that of the outlet of 94; and the radial dimension across the inlet of passage 93, which is on the larger radius, is less than that across the inlet of passage 94. But the nest plate 101 is not so arranged. Its disposition is such that the inner peripheral edge of the nest plate 101 is disposed radially inwardly (i. e., toward the axis) relative to the inner peripheral edge of the nest plate 91. Also, the outer peripheral edge of the nest plate 101 is positioned radially inwardly relative to the outer peripheral edge of the nest plate 91. Thus the passage 103 gradually increases in cross sectional area in the direction of flow of the liquid, and the passage 104 gradually decreases in the same direction relative to what it would be if the nest plate 101 were concentric. Also, passage 94 gradually decreases in cross sectional area and passage 93 gradually increases in cross sectional area relative to what it would be if the nest plate 91 were concentric. The situation may be visualized in this way: Some of the liquid which passes into the axial passage 88 from the passage 103 is sliced off by the outer peripheral edge of the nest plate 91 and crowded into the passage 94. This, it is believed, increases the velocity through passage 94 to what it would otherwise be, and, it is believed, decreases the velocity in the passage 93, and particularly along the wall of the nest plate 90. Also, some of the liquid entering the axial passage 89 from the passage 93 is sliced off and crowded into the passage 104, thus again providing accelerating function to the flow of liquid in the inner regions of the torus chamber. Possibly, the fact that the passage 103 gradually increases in cross sectional area and the passage 94 gradually decreases in cross sectional area while passage 104 gradually decreases in cross sectional area relative to what it would be if the nest plate 101 were concentric and passage 93 gradually increases in cross sectional area relative to what it would be if the nest plate 91 were concentric in a direction of flow of the liquid is a contributing factor. The result is that by selecting a proper diametral relationship of the nest plates relative to each other, a substantially uniform velocity of flow may be obtained across the torus chamber in the axial passage 89 thereof, and particularly at a point where the liquid comes into engagement with the impeller blades. If the velocity front is not uniform in the axial passage 88, the matter is not of particular concern since there are no blades functioning therein.

In the operation of the mechanism, as a whole, there is a re-generative action in that reaction forces are delivered in the form of work to the drive shaft, the same being delivered to the drive shaft through the turbine in the direction of motion of the drive shaft. The torque delivered by an engine to the drive shaft 1 is divided at the epicyclic gearing with part of the torque transmitted to the driven member 10 and the other part transmitting through the hydraulic mechanism to the drive shaft. Part of the divided torque rotates the impeller blades 46 which sets up flow of liquid in the torus chamber and the liquid in the torus chamber impresses itself upon the turbine blades 79 in the same direction of rotation as that given the drive shaft 1 by the engine. The re-generative force is fed back, so to speak, into the driving element. Accordingly, the power required to provide the reaction forces is not lost but is put back into the system as a driving force. The angularity of the impeller blades may be selected to meet the conditions which exist at any given moment as to speed of rotation of the parts and torque required to be delivered to the driven member.

I claim:

1. In a hydraulic mechanism, a rotary member having blades, a torus chamber for liquid extending around the axis of the rotary member, said torus chamber having an inner core and an outer wall defining a flow path for liquid, the blades of the rotary member operating in said flow path, and partition means in the torus chamber positioned between the core and the outer wall and defining inner and outer flow passages, said partition means being out of parallel relative to the core and outer wall to provide flow passages of varying cross section so as to tend to direct some of the liquid toward the core whereby to provide a substantially uniform liquid velocity front where the liquid approaches said blades.

2. In a hydraulic mechanism, a rotary impeller having substantially radial blades, a torus chamber surrounding the axis of the rotary member, said torus chamber in cross section having inner and outer axial extending flow passages and end sections turning through 180° for connecting the axial passages to thus provide a flow path for liquid through the torus chamber, the blades of the rotary member being positioned in the inner axial passage and partition means in the end sections having an offset diametral position relative to each other so as to tend to direct some of the flowing liquid toward the center of the passage whereby to provide a substantially uniform liquid velocity front where the liquid approaches said blades.

3. In a hydraulic mechanism, a rotary impeller having substantially radially disposed blades, a stator having substantially radially disposed blades, a turbine having substantially radially disposed blades, a torus chamber surrounding the axis of rotation of the impeller, said torus chamber having a core and outer walls and being elongated axially to provide an inner and an outer axially extending passage and having end portions, each turning through substantially 180° for connecting the axial passages, the blades of the impeller, stator and turbine operating in the inner axial passage, said impeller serving to cause flow of liquid in the torus chamber, and a partition in each end portion of the torus chamber dividing each end portion into inner and outer passages, at least one of the partitions being positioned so that the outer passage formed thereby progressively increases in cross sectional area and so that the inner passage progressively decreases in cross sectional area therein in the direction of flow of the liquid.

4. In a hydraulic mechanism, a rotary impeller having substantially radially disposed blades, a stator having substantially radially disposed blades, a turbine having substantially radially disposed blades, a torus chamber surrounding the axis of rotation of the impeller, said torus chamber having a core and outer walls and being elongated axially to provide an inner and an outer axially extending passage and having end portions, each turning through substantially 180° for connecting the axial passages, the blades of the impeller, stator and turbine operating in the inner axial passage, said impeller serving to cause flow of liquid in the torus chamber, and partition means in each end portion of the torus chamber generally following the contour of the core and the outer walls for dividing each end portion into a plurality of passages, said partition means having an offset diametral position relative to each other so that the edge of each partition at the outlet of one end portion is positioned relatively closer to the core than the edge of the partition at the inlet in the opposite end portion whereby to tend to direct some of the liquid toward the core and provide a substantially uniform liquid velocity front in the inner axial passage of the torus chamber.

5. In a hydraulic mechanism, a rotary impeller having substantially radially disposed blades, a stator having substantially radially disposed blades, a turbine having substantially radially disposed blades, a torus chamber surrounding the axis of rotation of the impeller, said torus chamber having a core and outer walls and being elongated axially to provide an inner and an outer axially extending passage and having end portions, each turning through substantially 180° for connecting the axial passages, the blades of the impeller, stator and turbine operating in the inner axial passage, said impeller serving to cause flow of liquid in the torus chamber, a partition in each end portion of the torus chamber generally following the contour of the core and the outer wall, said partitions having a diametral offset position relative to each other so as to tend to crowd some of the liquid toward the core whereby to provide a substantially uniform liquid velocity front in the inner axial passage of the torus chamber.

6. In a hydraulic mechanism, a rotary impeller having substantially radially disposed blades, a stator having substantially radially disposed blades, a turbine having substantially radially disposed blades, a torus chamber surrounding the axis of rotation of the impeller, said torus chamber having a core and outer walls and being elongated axially to provide an inner and an outer axially extending passage and having end portions, each turning through substantially 180° for connecting the axial passages, the blades of the impeller, stator and turbine operating in the inner axial passage, said impeller serving to cause flow of liquid in the torus chamber, a partition in each end portion of the torus chamber generally following the contour of the core and outer wall for dividing the end portions into inner and outer passages, said partitions having a diametral offset position relative to each other so that some of the liquid discharging from the outer passage tends to be directed into the inner passage in the opposite end portion whereby to provide a substantially uniform liquid velocity front in the inner axial passage of the torus chamber.

7. In a hydraulic mechanism, a rotary shaft, a torus chamber for liquid surrounding the shaft, said torus chamber being elongated in cross section to provide inner and outer axially extending passages and having curved end portions connecting the passages, an impeller, a stator and a turbine all having substantially radially disposed blades positioned and operating within the inner axially extending portion of the torus chamber, said impeller serving to cause flow of liquid through the torus chamber, and means for dividing the end portions of the torus chamber into inner and outer passages, said means having an offset diametral relationship so that the outlet of each outer passage has a greater radial extent than the inlet of the opposite outer passage so as to tend to direct some of the liquid into the inner passages whereby to provide a substantially uniform liquid velocity front in the inner axial passage of the torus chamber.

8. In a hydraulic mechanism, means forming a torus chamber having an inner core and an outer wall defining a flow path for liquid including a rotary member having blades positioned in said flow path, said torus chamber extending around the axis of the rotary member, and partition means in the torus chamber positioned between the core and the outer wall and defining inner and outer flow passages, said partition means being out of parallel relative to the core and outer wall to provide flow passages of varying cross section so as to tend to direct some of the liquid toward the core whereby to provide a substantially uniform liquid velocity front where the liquid approaches said blades.

ERNEST E. WEMP.

REFERENCES CITED

The following references are of record in the file of this patent:

UNITED STATES PATENTS

| Number | Name | Date |
|---|---|---|
| 879,476 | Krell | Feb. 18, 1908 |
| 1,596,459 | Schmidt | Aug. 17, 1926 |
| 1,993,741 | Jandasek | Mar. 12, 1935 |
| 2,169,232 | Flanders | Aug. 15, 1939 |
| 2,169,233 | Ponomareff | Aug. 15, 1939 |
| 2,368,279 | Wemp | Jan. 30, 1945 |

FOREIGN PATENTS

| Number | Country | Date |
|---|---|---|
| 177,014 | Switzerland | July 16, 1935 |